(12) United States Patent
Aubry et al.

(10) Patent No.: US 11,155,470 B2
(45) Date of Patent: Oct. 26, 2021

(54) SMALL-PORE CALCIUM HYDROXIDE PARTICLES AND METHOD FOR MANUFACTURING SAME

(71) Applicant: Carmeuse Research and Technology, Louvain-la-Neuve (BE)

(72) Inventors: Elise Aubry, Marchin (BE); Nicolas Vekony, Chastre (BE); Bernard Somerhausen, Nivelles (BE)

(73) Assignee: Carmeuse Research and Technology

( * ) Notice: Subject to any disclaimer, the term of this patent is extended or adjusted under 35 U.S.C. 154(b) by 25 days.

(21) Appl. No.: 16/465,271

(22) PCT Filed: Dec. 13, 2017

(86) PCT No.: PCT/EP2017/082628
§ 371 (c)(1),
(2) Date: May 30, 2019

(87) PCT Pub. No.: WO2018/114526
PCT Pub. Date: Jun. 28, 2018

(65) Prior Publication Data
US 2019/0389735 A1    Dec. 26, 2019

(30) Foreign Application Priority Data
Dec. 22, 2016   (BE) .................... 2016/5962

(51) Int. Cl.
| | | |
|---|---|---|
| *C01F 11/00* | (2006.01) | |
| *C01F 11/02* | (2006.01) | |
| *B01D 53/50* | (2006.01) | |
| *B01D 53/82* | (2006.01) | |
| *B01J 20/04* | (2006.01) | |
| *B01J 20/28* | (2006.01) | |
| *B01J 20/30* | (2006.01) | |
| *C04B 2/06* | (2006.01) | |

(52) U.S. Cl.
CPC .......... *C01F 11/02* (2013.01); *B01D 53/508* (2013.01); *B01D 53/82* (2013.01); *B01J 20/041* (2013.01); *B01J 20/2808* (2013.01); *B01J 20/28059* (2013.01); *B01J 20/28071* (2013.01); *B01J 20/28083* (2013.01); *B01J 20/28085* (2013.01); *B01J 20/3064* (2013.01); *B01J 20/3085* (2013.01); *C04B 2/06* (2013.01); *B01D 2251/404* (2013.01); *B01D 2251/604* (2013.01); *B01D 2253/306* (2013.01); *B01D 2253/31* (2013.01); *B01D 2253/311* (2013.01); *B01D 2257/302* (2013.01); *C01P 2006/12* (2013.01); *C01P 2006/14* (2013.01); *C01P 2006/17* (2013.01)

(58) Field of Classification Search
CPC ......... C01F 11/02; C04B 2/06; B01D 53/508; C01P 2006/12; C01P 2006/14; C01P 2006/16; C01P 2006/17
See application file for complete search history.

(56) References Cited

U.S. PATENT DOCUMENTS

| 6,322,769 B1 | 11/2001 | Langelin |
| 10,669,199 B2 | 6/2020 | Chini et al. |
| 2016/0279567 A1* | 9/2016 | Dumont ................ B01J 20/045 |

FOREIGN PATENT DOCUMENTS

| DE | 3716566 A1 * | 12/1988 |
| EP | 0 558 522 A1 | 9/1993 |
| EP | 0 861 209 A1 | 9/1998 |
| EP | 2 039 655 A1 | 3/2009 |
| EP | 2039655 A1 | 3/2009 |
| JP | 2002 029738 A | 1/2002 |
| JP | 2002029738 A | 1/2002 |
| JP | 2005 350343 A | 12/2005 |
| JP | 2005350343 A | 12/2005 |
| WO | 92/09528 A1 | 6/1992 |
| WO | WO-2015-085375 * | 6/2015 |
| WO | 2017/029209 A1 | 2/2017 |

* cited by examiner

*Primary Examiner* — Steven J Bos
(74) *Attorney, Agent, or Firm* — Dentons Cohen & Grigsby P.C.

(57) ABSTRACT

The present invention relates to calcium hydroxide particles having a total pore volume greater than 0.18 cm$^3$/g, said total pore volume being calculated with the BJH method for a range of pores having a diameter of between 20 and 1000 Å, said particles being characterized in that the BJH partial pore volume for the range of pores having a diameter of between 20 and 100 Å corresponds to more than 20% of said BJH total pore volume.

20 Claims, 5 Drawing Sheets

SMALL-PORE CALCIUM HYDROXIDE PARTICLES AND METHOD FOR MANUFACTURING SAME

CROSS-REFERENCE TO RELATED APPLICATION

This application is a national stage entry of PCT/EP2017/082628, filed on Dec. 13, 2017, which claims the benefit of Belgian Application No. 20160005962, filed on Dec. 22, 2016, each of which is incorporated herein by reference in its entirety.

FIELD OF INVENTION

The present invention relates to calcium hydroxide particles having a large number of small pores, making them particularly suitable for treating flue gases containing acid pollutants. It also relates to a method allowing the preparation of these calcium hydroxide particles having distinctive properties.

BACKGROUND

Calcium hydroxide is known for its efficient treatment of flue gases containing acid pollutants, inter alia over a range of temperatures lower than 170° C. In general, one of the acids that is most difficult to capture in flue gases using reagents of calcium type is $SO_2$.

To capture acids contained in flue gases, the properties to be optimised are specific surface area, generally measured with the BET method (Brunauer-Emmett-Teller) i.e. the surface area of the particles accessible to acids, and pore volume generally measured with the BJH method (Barrett-Joyner-Halenda) i.e. the volume able to capture acids before they react with $Ca(OH)_2$. Hydrate producers have been continually striving for several decades to improve these characteristics. There are several generations of calcium hydrate that can be classified as follows.

Generation «0» is composed of an ordinary, dry $Ca(OH)_2$ hydrate having a residual $H_2O$ percentage lower than 1%. This hydrate is derived from a conventional hydration method followed by grinding to obtain an application-related particle size, and typically having a particle size of less than 150 µm.

Improved generation «0» differs from generation 0 in that the particles are subjected to selection to retain only the largest particles having greater pore volume and hence improved properties for flue gas treatment. The typical properties of this product are a specific surface area of 20 $m^2/g$ and pore volume 0.09 $cm^3/g$.

Next, generation 1 was developed with the addition of an additive in the manufacturing process to increase specific surface area. This additive has the effect of delaying the hydration reaction, which imparts special properties to the hydrates. Excess water is generally used for hydration with 5 to 10% residual water. Humidity must not be too high to allow optional grinding in a mill. This is the product described in patent EP 0 558 522. The specific surface area of this type of $Ca(OH)_2$ is approximately 40-50 $m^2/g$, but the pore volume remains lower than 0.1 $cm^3/g$ with values in the region of 0.08 $cm^3/g$.

Finally, generation «2» emerged with a two-step method: hydration in a hydrator with up to 20-30% residual $H_2O$; flash drying at over 350° C. in a controlled atmosphere followed by grinding.

The $Ca(OH)_2$ produced with this method has a large specific surface area in the region of 40 $m^2/g$ and also a large pore volume of approximately 0.2 $cm^3/g$. This type of hydroxide is described in patent EP 0 861 209. The presence of a large specific surface area enables the acid molecules contained in flue gases to easily enter into the pores, and a large total pore volume allows the reaction between the acid molecules and $Ca(OH)_2$ at the pore walls. It is therefore chiefly within the pores that acid capture takes place.

In the current state of knowledge, there is every reason to believe that the entire reaction occurs on the surface of the pores. Indeed, the diffusion of $SO_2$ through a layer of formed $CaSO_3$ or $CaSO_4$ takes a certain time, which is not compatible with some existing flue gas treatment equipment, hence the advantage of having the greatest volume of accessible pores.

Total pore volume is not the only determining factor. The diameter of these pores is of major importance too. For example, patent EP 0 861 209 recommends giving preference to pores having a diameter of between 100 and 400 Angstroms. It therefore claims the majority presence of medium-size pores.

Yet, $SO_2$ molecules have a molecular diameter of about 3.8 Angstroms. Pores of medium size between 100-400 Angstroms are therefore much larger than the molecules to be captured. It could therefore prove to be more judicious to give preference to hydrates having smaller pores.

Document JP 2005350343 discloses a method for increasing pore volume using varied additives such as diethylene glycol, sorbitol and by coating the particles of hydrated lime with a silicone-based resin. The method uses a large excess of water in proportions of 1.5 to 5, preferably 3.2 times, the amounts theoretically required for the hydration reaction of lime. However, it only recommends a final residual humidity after two contacting steps with water of between 35 and 55% after pressing, and a residual water value before drying of 35 to 45% being preferred. The calcium hydroxide obtained has a BET specific surface area larger than 30 $m^2/g$ and a total pore volume (20-1000 Å) in the region of 0.30 $cm^3/g$. However, this document does not mention either the CaO content in the starting lime or the pore volume contained in the fraction of pores of 20 to 100 Å. Solely the global pore volume for pores of 20 to 1000 Å is mentioned.

Document JP 2002029738 discloses a method intended to increase pore volume without reducing bulk density. For this purpose, the particles of calcium hydroxide are simultaneously subjected to grinding and compaction to reduce storage space. This document does not give any information on the residual humidity level of the calcium hydroxide produced, or on the characteristics of the starting reagent. It does not focus on the impact of the relationship between pore size and pore volume, in particular on the fraction of pores smaller than 100 Å, and on the absorption capacity of effluent gases.

Document EP 2 039 655 discloses a hydration method in the presence of an additive targeting residual humidity before drying of between 35 and 55%. This document does not give information on the CaO content of the reagent.

AIMS OF THE INVENTION

The present invention aims to produce calcium hydrates having very small pores to improve acid capture. More specifically, the present invention aims to develop a new generation of calcium hydrates with a large proportion of pores having a diameter smaller than 200 Å, preferably smaller than 100 Å, whilst maintaining a high total pore volume.

DESCRIPTION OF THE DRAWINGS

The characteristics and advantages of the present invention will become apparent on reading the detailed description below referring to FIGS. 1 to 5.

MAIN CHARACTERISTIC ELEMENTS OF THE INVENTION

Figure 1:
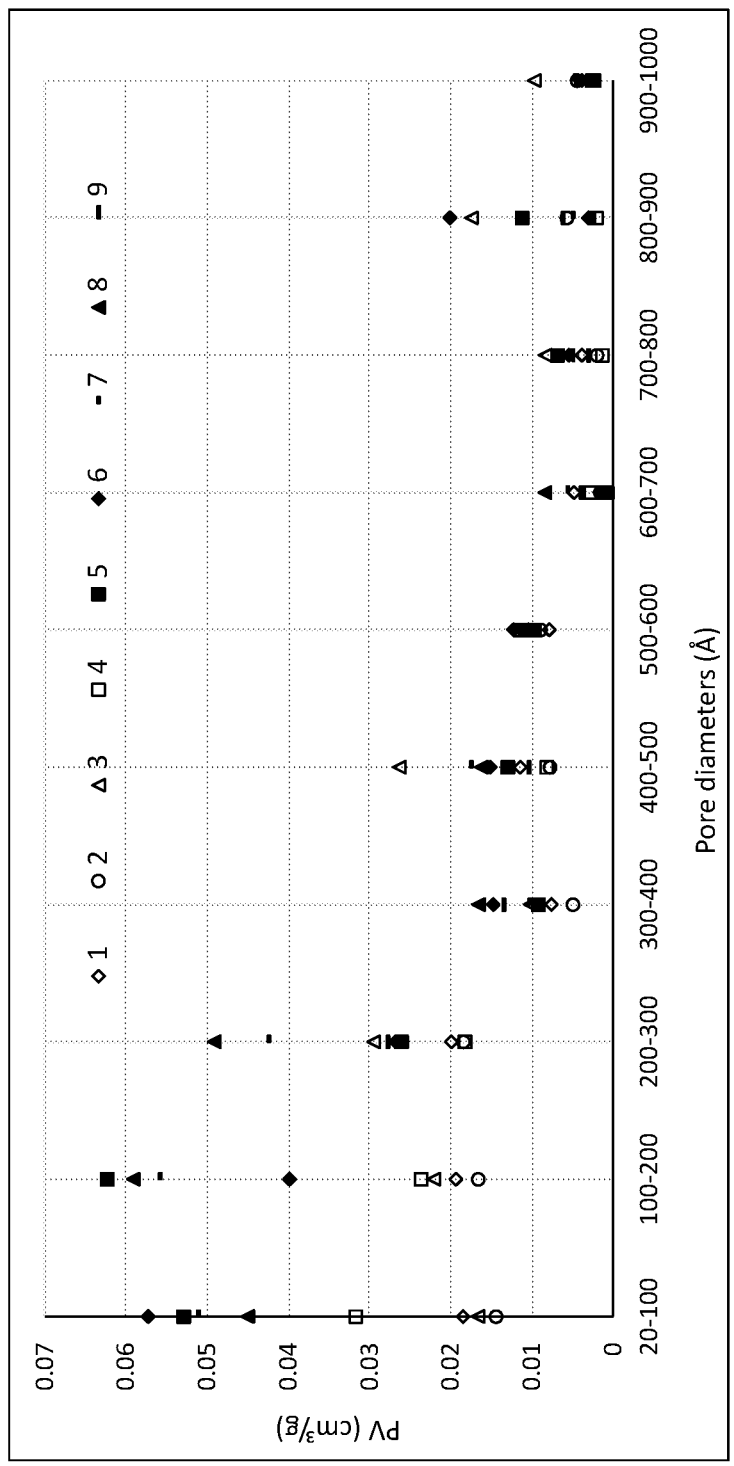
FIGS. 1 and 2 respectively illustrate the BJH volume distribution and surface area distribution of the pores as a function of their diameter per interval of 100 Å with the exception of the first range extending between 20 and 100 Å.

The present invention relates to calcium hydroxide particles having a total pore volume greater than 0.18 cm$^3$/g, said total pore volume being calculated using the BJH method for a pore range having a diameter of between 20 and 1000 Å, said particles being characterized in that the BJH partial pore volume for the range of pores having a diameter of between 20 and 100 Å corresponds to more than 20% of said BJH total pore volume.

In particular embodiments of the invention, the calcium hydroxide particles have at least one or a suitable combination of the following characteristics:
- the BJH partial pore volume for the range of pores having a diameter of between 20 and 200 Å corresponds to more than 40% of said BJH total pore volume;
- the BJH partial pore volume for the range of pores having a diameter of between 20 and 200 Å correspond to more than 50% of said BNH total pore volume;
- the BJH partial pore volume for the range of pores having a diameter of between 20 and 100 Å is greater than 0.04 cm$^3$/g, and preferably greater than 0.05 cm$^3$/g;
- the BJH partial pore volume for the range of pores having a diameter of between 20 and 200 Å is greater than 0.06 cm$^3$/g, preferably greater than 0.09 cm$^3$/g, and more preferably greater than 0.1 cm$^3$/g;
- they have a BET specific surface area larger than 40 m$^2$/g, preferably larger than 45 m$^2$/g, and more preferably larger than 50 m$^2$/g.

The present invention also relates to the method for preparing the above-described calcium hydroxide particles, comprising the steps of:
- mixing, with water and a hydration-delaying additive, a base material having a calcium oxide content determined as per standard EN 459-2—paragraph 5.8, higher than 90 weight %, the water/base material weight ratio in said mixture is between 0.9 and 1.2, and said mixture having residual humidity higher than 20 weight % and lower than 30 weight %;
- drying said mixture to a form a hydrate having residual humidity lower than 2% and preferably lower than 1% by weight.

In some particular embodiments of the invention, the method comprises at least one or a suitable combination of the following characteristics:
- said calcium oxide content is higher than 93%;
- the MgO content is 2 weight % or lower;
- the water/base material weight ratio in said mixture is between 1 and 1.05;
- the content of additive is 0.4 weight % or higher, preferably between 0.5 and 5 weight %, more preferably between 0.5 and 4.5 weight %, further preferably between 0.5 and 2.5 weight %, or from 0.5 to 1.5 weight % relative to the base material;
- the hydration-delaying additive is selected from the list comprising ethylene glycol, diethylene glycol, triethylene glycol, monoethanolamine, diethanolamine, triethanolamine, monopropylene glycol, dipropylene glycol, the mixtures and derivative products thereof;
- the base material has a $T_{60}$ reactivity greater than 50 seconds, preferably greater than 60 seconds, and more preferably greater than 100 seconds.

It also relates to the method for purifying flue gases, comprising the step of using the calcium hydroxide particles such as described above.

DETAILED DESCRIPTION

The present invention relates to calcium hydroxide particles combining a large specific surface area and large pore volume with a sizeable proportion of pores having a diameter smaller than 200 Å (<20 nm). More specifically, the calcium hydroxide particles of the invention have a BET specific surface area larger than 40 m$^2$/g, preferably larger than 45 m$^2$/g, more preferably larger than 50 m$^2$/g. The BJH total pore volume of pores having a diameter of between 20 and 1000 Å (2 to 100 nm) is greater than 0.14 cm$^3$/g, preferably greater than 0.16 cm$^3$/g, and more preferably greater than 0.18 cm$^3$/g and even 0.19 cm$^3$/g. The partial pore volume for the range of pores having a diameter of between 20 and 200 Å is greater than 0.06 cm$^3$/g, preferably greater than 0.08 cm$^3$/g, more preferably greater than 0.1 cm$^3$/g. Within this range of pore diameters smaller than 200 Å, the partial pore volume for pores of diameter between 20 and 100 Å is greater than 0.04 cm$^3$/g, preferably greater than 0.045 cm$^3$/g, and further preferably greater than 0.05 cm$^3$/g. In percent terms, more than 18% and preferably more than 20% of the total pore volume is found in the range of pores having a diameter of between 20 and 100 Å (2 to 10 nm). For the 20 to 200 Å range (2 to 20 nm), more than 40%, preferably more than 45%, and more preferably more than 50% of the total pore volume is found therein.

To manufacture Ca(OH)$_2$ particles having these properties, the method of the invention combines the following characteristics: use of a base lime having high CaO content, hydration thereof in the presence of a hydration-delaying additive to form a mixture having residual humidity higher than 20 weight % and preferably lower than 30 weight %. In the presence of lime with high CaO content, the additive allows the generation of small pores and the high level of residual humidity allows the pore volume in this range of small pores to be increased. As a result, this particular ratio of specific surface area/pore volume allows optimisation of the reactive surface area available for sorption of acid gases.

More specifically, the method of the invention comprises the following steps:
Providing lime particles having an available CaO content higher than 90%, and more preferably higher than 93% by weight. By available CaO content, it is meant the content contained in the quicklime, and optionally in the hydrate in the event that slight hydration of lime occurs at the inlet to the hydrator. This content does not include the CaO contained in the carbonate (CaCO$_3$)

and in the sulphate ($CaSO_4$) which are not effective for subsequent capture of $SO_2$ in flue gases. The lime particles also have a sulphur content that is as low as possible, namely below 0.2% and preferably between 0.01 and 0.07% by weight. The MgO content thereof is lower than 8%, and preferably lower than 3% and even 2% by weight, and the $CO_2$ content is 1.5 weight % or lower. As is conventional, the lime may also contain impurities such as aluminium oxide, iron, manganese or silicon.

The lime particles typically have a particle size distribution of between 0 and 2 mm, 0 and 10 mm, 2 and 10 mm or 5 and 25 mm. The lime can also be milled lime of micrometric size, for example having a particle size distribution of between 0 and 100 μm.

Hydration is performed with a water/lime weight ratio of between 0.9 and 1.2 and preferably between 1 and 1.05, to obtain a mixture having residual humidity of 20% or higher and preferably between 25% et 30% by weight. Typically, the temperature of the water is between 10 and 40° C. Hydration is performed in the presence of a hydration-delaying additive comprising at least one alcohol chemical function (—O—H) and/or ($NH_x$, with x=1.2 or 4) in a proportion of at least 0.4 weight % relative to the lime fed into the hydrator. Preferably, the content of additive is between 0.5 and 5 weight %, but for reasons of economy it is rather more limited to a range of 0.5 to 4.5 weight %, further preferably 0.5 to 3.5 weight %, even 0.5 to 2.5% or even between 0.5 and 1.5 weight %. The additive is selected from the non-exhaustive list comprising ethylene glycol, die thylene glycol, triethylene glycol, monoethanolamine, diethanolamine, triethanolamine, monopropylene glycol, dipropylene glycol, the mixtures and derivative products thereof.

The mixture thus obtained is then dried to reduce residual humidity to less than 2% and preferably less than 1% by weight. For drying hot air is used, previously heated through an exchanger in which a combustion gas circulates. Drying is conducted without direct contact between the combustion gas and the hydrate. Typically, drying is carried out in an ultra-rapid dryer. Drying takes place within a maximum of 2 or 3 seconds with hot air at a temperature of 300-400° C. On leaving the dryer, the hydrate has a temperature of between about 85 and 90° C.

Finally, the hydrate is ground to reduce the particle size to below 200 μm, and preferably below 150 μm.

To illustrate the invention, different powders of calcium hydroxide were prepared.

EXAMPLES

As raw materials, several limes having different CaO/MgO contents, different particle sizes and different reactivity were used. Tables 1 to 6 give the different samples tested. Samples 1 to 4 and 10 to 14 are comparative examples, and samples 5 to 9 and 15 to 18 are examples representing the invention. These Tables indicate the weight content of available lime which includes quicklime CaO and the hydrate $Ca(OH)_2$, determined according to standard EN 459-2 (September 2010 version), paragraph 5.8. They also indicate the MgO content determined according to this same standard, paragraph 5.2. The reactivity of quicklime was evaluated in usual manner using $T_{60}$, a parameter corresponding to the time needed to raise the temperature of the lime/slaking water system up to 60° C., slaking of the lime being conducted following the protocol of paragraph 6.6 of above-mentioned standard EN 459-2.

The parameters of the method given in Tables 2 and 5 were modulated by acting on the following parameters, taken alone or in combination, for the different samples: residual humidity before drying close to 20% or in the region of 20-25% by weight, without or with additive, and in the latter case two types of additive were tested (DEG for diethylene glycol or TEA for triethanolamine).

The hydrates obtained were characterized as follows. The BET specific surface area of the powders was measured in accordance with standard ISO9277, second Edition of Sep. 1, 2010. The total pore volume and pore distribution as a function of pore diameter were calculated based on the step-by-step analysis of the isotherm desorption branch using the BJH method of Barrett, Joyner and Halenda (1951), conventionally used with 77K nitrogen as adsorbent gas. The method is described in standard DIN66134 (February 1998 version). It allows the calculation of pore volume distribution as a function of pore diameter on the assumption that the pores are cylindrical. Total pore volume and pore volume distribution were determined for the range of pores having a diameter ranging from 20 to 1000 Å. The results are given below per interval of 100 Å (20-100 Å, 100-200 Å, 200-300 Å, etc.). On the basis of pore volume distribution determined with the BJH method, the BJH surface area distribution of the pores was also calculated per interval of 100 Å again assuming the pores are cylindrical.

Figure 2:
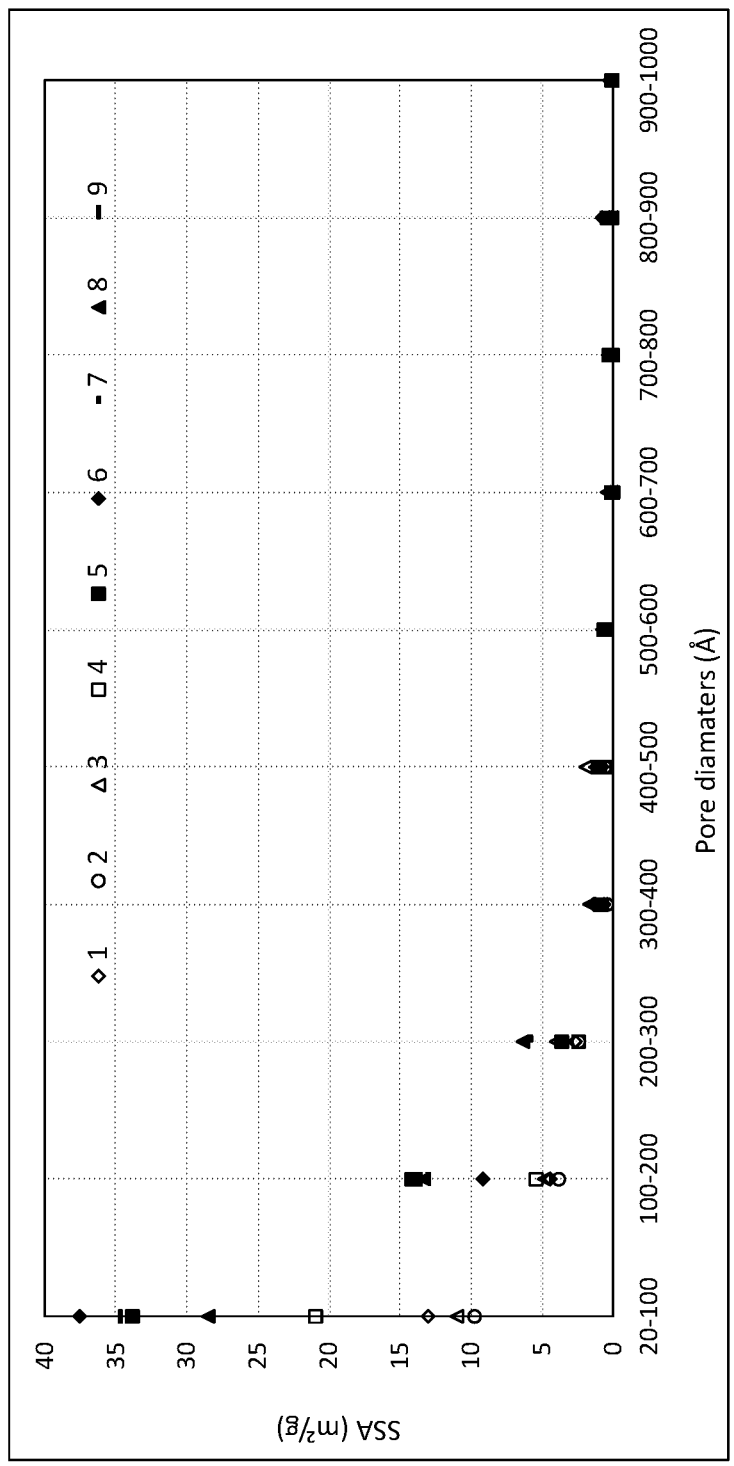
Figure 3:
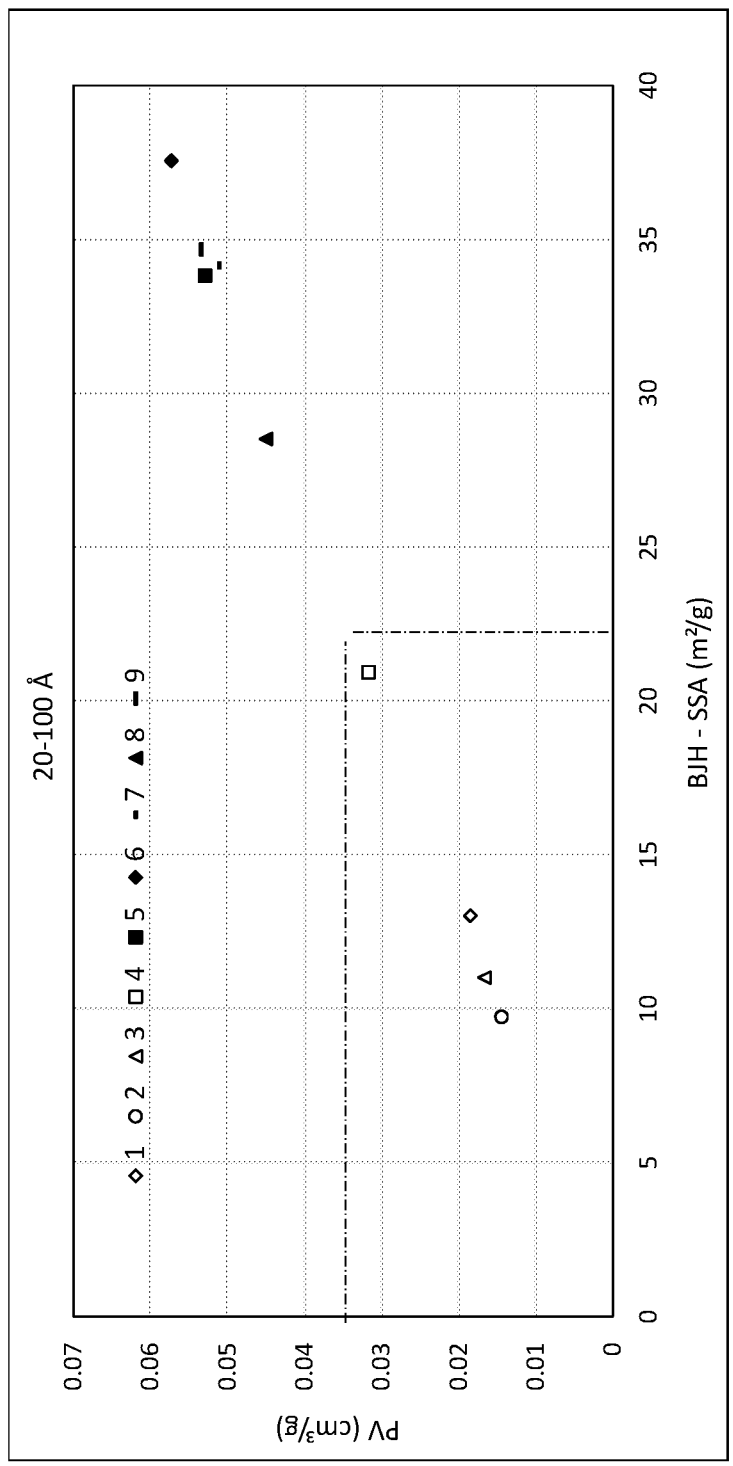
FIGS. 3 and 4 illustrate partial pore volume as a function of partial specific surface area for diameter ranges 20-100 Å and 20-200 Å, respectively.
Figure 4:
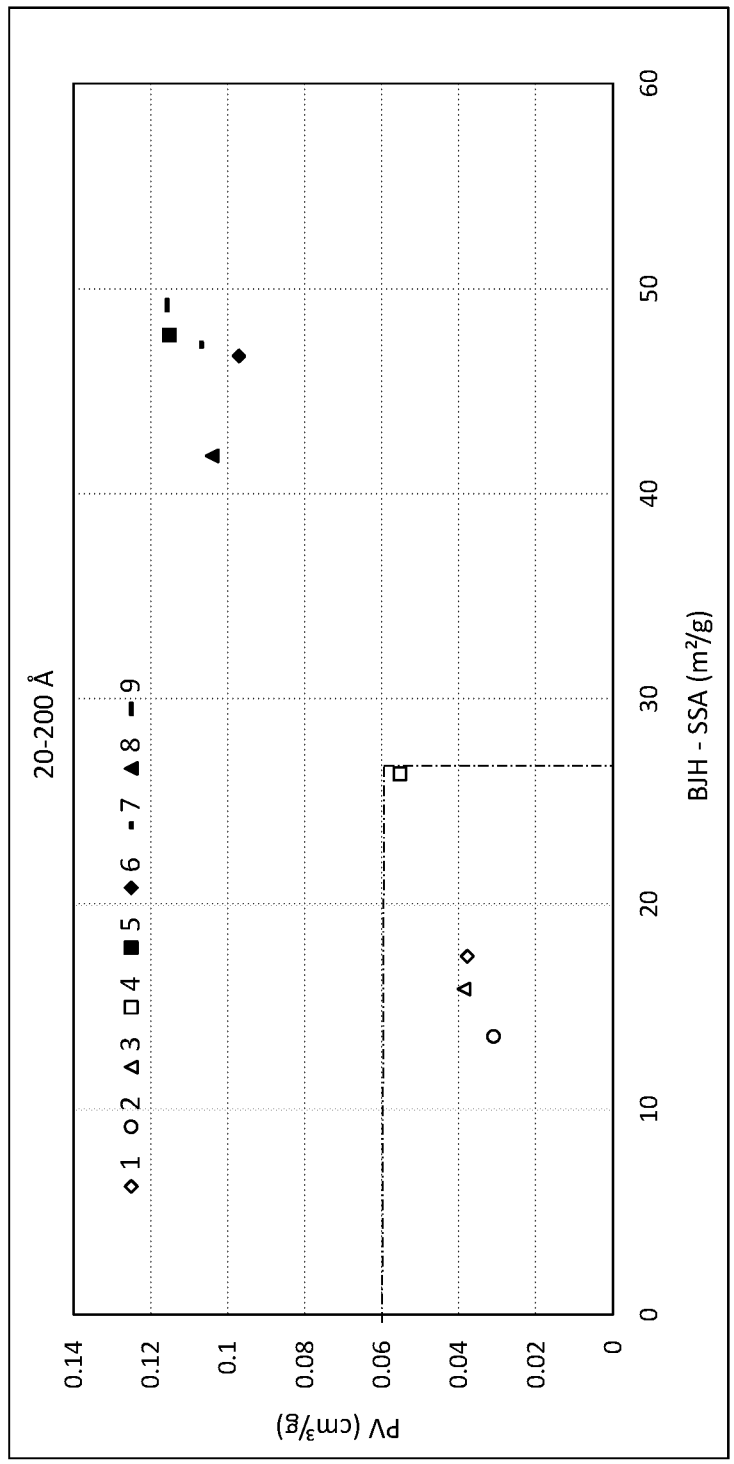

FIGS. 1 and 2 respectively illustrate the volume distribution and surface area distribution of the pores per interval of 100 Å for Examples 1 to 9. FIGS. 3 and 4 respectively illustrate the partial pore volume as a function of partial specific surface area for the intervals 20-100 and 20-200 Å, with a dotted line delimiting the results of comparative tests and the results of tests according to the invention. For the different samples, Table 3 gives the BET total specific surface area, BJH total pore volume, BJH partial pore volume and BJH partial specific surface area for the ranges 20-100 and 20-200 Å. The ratio expressed in percent between the partial pore volumes and total pore volume for these ranges is also given.

For samples 5 to 9 representing the invention, a distinct increase is observed in BJH total pore volume and BET specific surface area, compared with the comparative samples (Tables 3 and 6). The BET specific surface area is larger than 40 $m^2/g$ and even larger than 50 $m^2/g$ for samples 5 to 9. A smaller specific surface area of 43 $m^2/g$ is observed for comparative sample 10. This decrease is attributed to the MgO content, higher than 2%, the corollary of which is a lower content of available CaO (Table 4). For the samples of the invention, the BJH total pore volume is greater than 0.14 $cm^3/g$, even greater than 0.19 $cm^3/g$ for samples 5 to 9. Compared with the comparative samples, the partial pore volume is significantly increased in the 20-100 Å range with values greater than 0.04 $cm^3/g$ even greater than 0.05 $cm^3/g$. In the 20-200 Å range, the partial pore volume increases to above 0.08 $cm^3/g$ and even above 0.09 $cm^3/g$ for samples 5 to 9. Within these samples 5 to 9 having close MgO contents, FIGS. 3 and 4 show that sample 8 having a lower $T_{60}$ i.e. stronger reactivity, exhibits a less favourable balance between pore volume/specific surface area for the ranges 20-100 and 20-200 Å, compared with samples 5-7 and 9.

TABLE 1

|  | Sample No | MgO wt. % | Available CaO wt. % | T60 s | Particle size mm |
|---|---|---|---|---|---|
| Comparative | 1 | 0.58 | 96 | 125 | 0-10 |
|  | 2 | 0.53 | 93.5 | 108 | 0-10 |
|  | 3 | 0.55 | 94.2 | 70 | 0-10 |
|  | 4 | 0.52 | 98 | 90 | 0-10 |
| Invention | 5 | 0.40 | 95 | 107 | 0-10 |
|  | 6 | 0.53 | 95.1 | 98 | 0-10 |
|  | 7 | 0.67 | 93.8 | 262 | 0-2 |
|  | 8 | 0.59 | 95.5 | 57 | 2-10 |
|  | 9 | 0.58 | 96.9 | 125 | 0-10 |

TABLE 2

|  | Sample No | Additive wt. % | Additive type | $H_2O$/lime | Residual $H_2O$ after hydration/ before drying wt. % |
|---|---|---|---|---|---|
| Comparativ | 1 | 0 | / | 0.6 | 0.6 |
|  | 2 | 0 | / | 0.6 | 0.6 |
|  | 3 | 0 | / | 1.05 | 22.9 |
|  | 4 | 1 | DEG | 0.6 | 0.7 |
| Invention | 5 | 1 | DEG | 1.05 | 25 |
|  | 6 | 1 | TEA | 1.05 | 22.2 |
|  | 7 | 1 | DEG | 1.05 | 25 |
|  | 8 | 1 | DEG | 1.05 | 25 |
|  | 9 | 1 | DEG | 1.05 | 22.2 |

TABLE 3

|  | Sample N° | BET SSA (m2:g) | BJH PV (cm$^3$/g) total 20-1000 A° | BJH PV partial 20-100 A° | % of total | BJH PV partial 20-200 A° | % of total | BJH SSA (m$^2$/g) partial 20-100 A° | BJH SSA partial 20-200 A° |
|---|---|---|---|---|---|---|---|---|---|
| Comparative | 1 | 23 | 0.100 | 0.018 | 18 | 0.038 | 38 | 13 | 17 |
|  | 2 | 18 | 0.085 | 0.014 | 17 | 0.031 | 37 | 10 | 14 |
|  | 3 | 25 | 0.154 | 0.017 | 11 | 0.039 | 25 | 11 | 16 |
|  | 4 | 31 | 0.111 | 0.032 | 29 | 0.055 | 50 | 21 | 26 |
| Invention | 5 | 55 | 0.195 | 0.053 | 27 | 0.115 | 59 | 34 | 48 |
|  | 6 | 55 | 0.196 | 0.057 | 29 | 0.097 | 50 | 38 | 47 |
|  | 7 | 57 | 0.209 | 0.051 | 24 | 0.107 | 51 | 34 | 47 |
|  | 8 | 53 | 0.218 | 0.045 | 21 | 0.104 | 48 | 29 | 42 |
|  | 9 | 56 | 0.194 | 0.053 | 28 | 0.006 | 60 | 35 | 49 |

The capacity of $SO_2$ sorption by the hydrated lime of the invention was measured statically for samples 1, 7, 8 and 9 as follows. A given quantity of sample, here approximately 0.5 to 1 g, was placed in a reactor between two beds of quartz wool. The assembly was placed in an oven at 150° C. Prior to the $SO_2$ sorption test, the reactor containing the sample was flushed with a stream of dry air to remove humidity from the sample, typically of between 0 and 1%, which could impact results. The stream of dry air was then replaced by a mixture of humidified air and gas containing $SO_2$ and $CO_2$. The mixture thus generated comprised 358 ppmv of $SO_2$, 4.5% of $CO_2$ by volume and 10 g/m$^3$ of $H_2O$. The whole was injected into a loop bypassing the sample until a constant concentration was measured at the outlet of the circuit. Only then was the reactor containing the sample flushed with the mixture at a flow rate of 150 ml/min. The quantity of outgoing $SO_2$ was measured with a micro-chromatograph (μ-GC). The amount of $SO_2$ captured by the sample is equal to the difference between the amount of ingoing $SO_2$ at the inlet of the reactor and the amount of outgoing $SO_2$ at the outlet of the reactor, integrated over the entire flushing time of the sample with the gas mixture until the concentration of outgoing $SO_2$ is equal to 90% of the starting concentration. For samples 1, 7, 8 and 9, the percent of captured mass i.e. the amount of captured $SO_2$ relative to the mass of the sample was respectively 4; 7; 5.7 and 6.2%. Compared with reference 1, the $SO_2$ sorption capacity was 30% to 42% higher for the samples of the invention. Sample 8 exhibited lower sorption capacity than samples 7 and 9, which can be accounted for by the less favourable balance between pore volume and specific surface area for the ranges 20-100 and 20-200 Å as previously mentioned.

Figure 5:
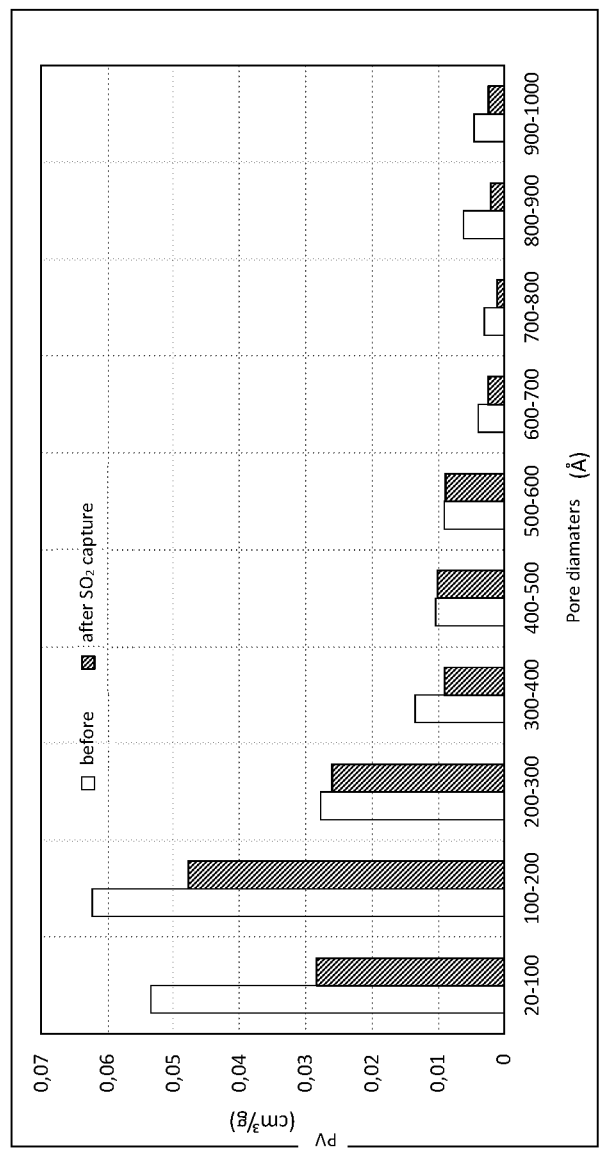
FIG. 5 illustrates the volume distribution of the pores as a function of their diameter per interval of 100 Å before and after $SO_2$ capture.

Analysis of pore volume distribution after $SO_2$ capture, performed on sample 9, showed that the pores having a diameter smaller than 200 Å and more specifically those having a diameter smaller than 100 Å are most useful for capturing $SO_2$ (FIG. 5). Therefore, in the 20-100 Å range, the pore volume was reduced by almost 50% after $SO_2$ capture, and by almost 20% in the 100-200 Å range. Over and above 200 Å, the reduction in pore volume was no longer significant. This confirms that very small pores having a diameter of less than 200 Å, and preferably less than 100 Å, are particularly useful for $SO_2$ capture.

Examples 10 to 18

These examples were performed to demonstrate the pertinence of the lime hydration method to obtain a significant pore volume within the fraction of pores between 20 and 100 Å. Examples 10 to 14 are comparative examples, and examples 15 to 18 are examples of the invention.

Examples 10 and 11 have an available CaO concentration that is too low and lower than the concentration of the invention, and the total pore volume obtained is too small. Examples 12 and 13 were carried out outside the $H_2O$/lime concentration of 0.9 to 1.2 which led to a residual $H_2O$ content after hydration and before drying of 9.7% and 35% respectively, which finally led to an insufficient total pore volume (20-1000 Å) or partial pore volume (20-100 Å). Example 14 only contained 0.25% of hydration-delaying additive (diethylene glycol), which led to a partial pore volume percentage in the 20 á 100 Å fraction that was too low.

TABLE 4

| Sample No | MgO | Available CaO wt. % | T60 s | Particle size mm |
|---|---|---|---|---|
| 10 | 2.25 | 91.9 | 105 | 0-20 |
| 11 | 4.72 | 89.9 | 150 | 0-10 |
| 12 | 0.53 | 95 | 95 | 0-10 |
| 13 | 0.53 | 95 | 95 | 0-10 |
| 14 | 0.53 | 95 | 95 | 0-10 |
| 15 | 0.53 | 95 | 95 | 0-10 |
| 16 | 0.53 | 95 | 95 | 0-10 |
| 17 | 0.53 | 95 | 95 | 0-10 |
| 18 | 0.53 | 95 | 95 | 0-10 |

TABLE 5

| Sample No | Additive wt. % | Type | $H_2O$/lime wt. % | Residual $H_2O$ after hydration/ before drying wt. % |
|---|---|---|---|---|
| 10 | 1% | DEG | 1.05 | 25.9 |
| 11 | 2% | DEG | 1 | 24.1 |
| 12 | 1% | DEG | 1.3 | 35 |
| 13 | 1% | DEG | 0.8 | 9.7 |
| 14 | 0.25% | DEG | 1.05 | 24.6 |
| 15 | 2% | DEG | 1.05 | 23.5 |
| 16 | 2.50% | DEG | 1.05 | 25.8 |
| 17 | 3.50% | DEG | 1.05 | 25.9 |
| 18 | 4.50% | DEG | 1.05 | 27.4 |

TABLE 6

| Sample No | BET SSA ($m^2/g$) | BJH PV ($cm^3/g$) total 20-1000 Å | partial 20-100 Å | % total | partial 20-200 Å | % total |
|---|---|---|---|---|---|---|
| 10 | 43 | 0.14 | 0.047 | 34 | 0.08 | 57 |
| 11 | 44.6 | 0.132 | 0.017 | 13 | 0.038 | 29 |
| 12 | 37.43 | 0.222 | 0.023 | 10 | 0.081 | 36 |
| 13 | 44.2 | 0.132 | 0.034 | 26 | 0.049 | 37 |
| 14 | 33.64 | 0.195 | 0.024 | 12 | 0.078 | 40 |
| 15 | 50.22 | 0.227 | 0.064 | 28 | 0.138 | 61 |
| 16 | 52.67 | 0.225 | 0.054 | 24 | 0.123 | 55 |
| 17 | 52.51 | 0.219 | 0.056 | 26 | 0.125 | 57 |
| 18 | 56.56 | 0.222 | 0.058 | 26 | 0.117 | 53 |

Examples 15 to 18 of the invention were performed with a concentration of available CaO of 95%, with a water/lime proportion of 1.05 leading to residual humidity of between 23.5 and 27.4%. The quantity of hydration-delaying additive (DEG) was in the range of 2 to 4.5% by weight.

All these parameters allowed to obtain BJH pore volumes (20-1000 Å) that were greater than 0.219 $cm^3/g$, a BET specific surface area larger than 50 $m^2/g$ and partial pore volume for the 20 á 100 Å pore range greater than 0.05 $cm^3/g$.

What is claimed is:

1. Calcium hydroxide particles having a BJH total pore volume greater than 0.18 $cm^3/g$, said total pore volume for a range of pores having a diameter of between 20 and 1000 Å, wherein a BJH partial pore volume of said particles, for the range of pores having a diameter of between 20 and 100 Å, is more than 20% of said BJH total pore volume.

2. The particles according to claim 1, wherein the BJH partial pore volume for the range of pores having a diameter of between 20 and 200 Å is more than 40% of said BJH total pore volume.

3. The particles according to claim 1, wherein the BJH partial pore volume for the range of pores having a diameter of between 20 and 200 Å is more than 50% of said BJH total pore volume.

4. The particles according to claim 1, wherein the BJH partial pore volume for the range of pores having a diameter of between 20 and 100 Å is greater than 0.04 $cm^3/g$.

5. The particles according to claim 1, wherein the BJH partial pore volume for the range of pores having a diameter of between 20 and 200 Å is greater than 0.06 $cm^3/g$.

6. The particles according to claim 1, having a BET specific surface area greater than 40 $m^2/g$.

7. The particles according to claim 1, wherein said BJH total pore volume is greater than 0.19 $cm^3/g$.

8. A method for preparing calcium hydroxide particles according to claim 1, the method comprising the steps of:
   mixing a base material, having a calcium oxide content higher than 93 weight %, with water comprising a hydration-delaying additive comprising at least one of OH and $NH_x$, wherein x=1, 2 or 4, said mixture having a water/base material weight ratio between 0.9 and 1.2; said mixture having a residual humidity of 20 weight % or higher and lower than 30 weight %;
   drying said mixture to form a hydrate having a residual humidity lower than 2% by weight.

9. The method according to claim 8, wherein the base material has a MgO content lower than 8% by weight.

10. The method according to claim 8, wherein the water/base material weight ratio in said mixture is between 1 and 1.05.

11. The method according to claim 8, wherein the content of the hydration-delaying additive is 0.4 weight % or higher, relative to the base material.

12. The method according to claim 8, wherein the hydration-delaying additive comprising at least one of OH and $NH_x$ is selected from the group consisting of ethylene glycol, diethylene glycol, triethylene glycol, monoethanolamine, diethanolamine, triethanolamine, monopropylene glycol, dipropylene glycol, the mixtures and derivative products thereof.

13. The method according to claim 8, wherein the base material has a $T_{60}$ reactivity greater than 50 seconds.

14. A method for treating flue gases, the method comprising contacting the calcium hydroxide particles according to claim 1 with the flue gases.

15. The particles according to claim 1, wherein the BJH partial pore volume for the range of pores having a diameter of between 20 and 100 Å is greater than 0.05 $cm^3/g$.

16. The particles according to claim 1, wherein the BJH partial pore volume for the range of pores having a diameter of between 20 and 200 Å is greater than 0.1 $cm^3/g$.

17. The particles according to claim 1, having a BET specific surface area greater than 50 $m^2/g$.

18. The particles according to claim 1,
   wherein the BJH partial pore volume for the range of pores having a diameter of between 20 and 200 Å is more than 50% of said BJH total pore volume;
   wherein the BJH partial pore volume for the range of pores having a diameter of between 20 and 200 Å is greater than 0.1 $cm^3/g$;
   wherein said BJH total pore volume is greater than 0.19 $cm^3/g$; and
   having a BET specific surface area greater than 50 $m^2/g$.

19. The method according to claim 8, wherein the content of the hydration-delaying additive is between 0.5 and 1.5 weight % relative to the base material.

20. The method according to claim 8, wherein the base material has a $T_{60}$ reactivity greater than 100 seconds.

\* \* \* \* \*